No. 763,539. PATENTED JUNE 28, 1904.
G. F. BROWN.
PNEUMATIC TIRE COVERING.
APPLICATION FILED NOV. 25, 1902.
NO MODEL.
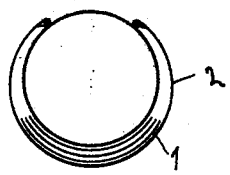
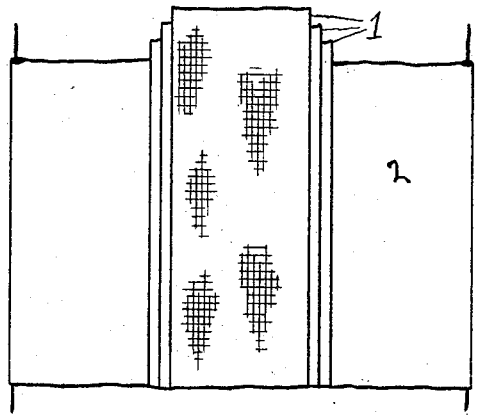
WITNESSES
INVENTOR
George Frederick Brown
BY
ATTORNEYS No. 763,539. Patented June 28, 1904.

UNITED STATES PATENT OFFICE.

GEORGE FREDERICK BROWN, OF HURSTVILLE, NEW SOUTH WALES, AUSTRALIA.

PNEUMATIC-TIRE COVERING.

SPECIFICATION forming part of Letters Patent No. 763,539, dated June 28, 1904.

Application filed November 25, 1902. Serial No. 132,797. (No model.)

*To all whom it may concern:*

Be it known that I, GEORGE FREDERICK BROWN, a subject of the King of Great Britain and Ireland, and a resident of Forest Road, Hurstville, in the State of New South Wales, Commonwealth of Australia, have invented a certain new and useful Unpuncturable Pneumatic-Tire Covering, of which the following is a specification.

Many styles of covers for the air-tubes of pneumatic tires have been devised for the purpose of preventing the delicate india-rubber membrane which contains the air from being punctured by tacks, pins, thorns, sharp flints, and other cutting and piercing agents which lie about on roads and other places over which vehicles that are fitted with pneumatic tires may have to pass. One of the most popular modes of reinforcing the protective covering of such tires is to place a thick strip of hide, canvas, rubber, or other suitable material between the outer cover and the india-rubber air-tube. This strip of thick material causes the tire to run heavily, and, moreover, it has been found that such thick strip by no means renders the covering puncture-proof. I have discovered that whereas one strip of thick homogeneous material may be readily punctured under conditions favorable to that end, yet if instead of such layer or strip of thick material two or more layers or strips of very thin textile fabric properly prepared be substituted therefor and treated in a manner to be hereinafter described the tire-covering will prove to be unpuncturable, while at the same time it will run lightly and freely.

In the drawings, Figure 1 is a cross-sectional view of tire with the cover and strips thereon, and Fig. 2 is a view showing the inside of the cover with the strips thereon.

In giving effect to my invention I prepare a cement in which there is a base of plaster-of-paris, red ocher, or other mineral that is adapted to set hard. Such materials, however, when they dry and set hard are very brittle and will readily crack and break when subjected to a shock. In order to overcome this difficulty, the earthy mineral must be mixed with suitable materials adapted to render the hard base both flexible and elastic. To this end I have prepared a cement composed of seventy-eight per cent. of common animal glue, (such as is ordinarily used for gluing pieces of wood together,) twelve per cent. of plaster-of-paris, five per cent. of plumbago, and five per cent. of red ocher, with as much water as would bring the composition to the consistency of linseed-oil. The constituent elastic and flexible parts of the cement may be varied provided there is a base of earthy material adapted to set hard, such as plaster-of-paris. With the flexible cement thus prepared I saturate very thin strips of textile fabric 1, preferably cotton, and lay such saturated strips longitudinally inside the tire-covering 2 and allow them to dry with or without the application of pressure. Two such thin strips of cemented textile material laid within the tire-covering will be sufficient to insure that under ordinary conditions the cover shall not be punctured.

If the tire is to be used in rough country where conditions are unfavorable, three strips may be employed, and under the most unfavorable conditions even as many as four of such cemented strips may be pasted within the tire-covering, thus rendering it absolutely puncture-proof. Four strips would, however, have the effect of causing the tire to run somewhat heavily, but not so heavily as it would by adopting the present system of introducing a thick strip of hide, canvas, or rubber as a reinforcing agent within the cover.

I wish it to be thoroughly understood that there are many minerals which could be used as a base for the cement; but I have preferably adopted plaster-of-paris because it is easily procurable, it is readily prepared, and it is cheap. There are also many materials which when mixed with the mineral base would have the effect of rendering the cement flexible and elastic. The composition I have specified above gives very satisfactory results, and when applied to the cover of a tire in the manner above set forth has rendered the latter unpuncturable even when considerable force exerted under the most favorable conditions has been applied specially for the purpose of puncturing the tire.

Having now described my invention, what I claim as new, and desire to secure by Letters Patent, is—

A reinforced covering to the air-tubes of pneumatic tires, such reinforcement consisting in pasting two or more thin strips of textile fabric, one upon the other, within the covering, such thin strips having been previously prepared by coating and saturating them with a cement composed of animal glue, plaster-of-paris, powdered plumbago, red ocher, and water, in the proportions and in the manner, approximately, as herein set forth.

In witness whereof I have hereunto set my hand in presence of two witnesses.

GEORGE FREDERICK BROWN.

Witnesses:
MANFIELD NEWTON,
A. R. W. MASSEY.